(12) United States Patent
Tashiro

(10) Patent No.: US 10,996,007 B2
(45) Date of Patent: May 4, 2021

(54) VEHICLE AIR-CONDITIONING APPARATUS AND CLOGGING DETECTION SYSTEM FOR VEHICLE AIR-CONDITIONING APPARATUS

(71) Applicant: MITSUBISHI ELECTRIC CORPORATION, Tokyo (JP)

(72) Inventor: Yusuke Tashiro, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/091,743

(22) PCT Filed: Jun. 10, 2016

(86) PCT No.: PCT/JP2016/067341
§ 371 (c)(1),
(2) Date: Oct. 5, 2018

(87) PCT Pub. No.: WO2017/212630
PCT Pub. Date: Dec. 14, 2017

(65) Prior Publication Data
US 2019/0137199 A1    May 9, 2019

(51) Int. Cl.
*F28F 27/00* (2006.01)
*B61D 27/00* (2006.01)
(Continued)

(52) U.S. Cl.
CPC .............. *F28F 27/00* (2013.01); *B60H 1/00* (2013.01); *B60H 1/00371* (2013.01);
(Continued)

(58) Field of Classification Search
CPC ..... B61D 27/00; B61D 27/0018; F25B 49/02; B60H 1/00; B60H 1/3225; B60H 1/00371;
(Continued)

(56) References Cited

U.S. PATENT DOCUMENTS 2,513,679 A  *  7/1950  Ritter ................. B61D 27/0018
                                                    62/184
2,718,186 A  *  9/1955  Lintern .............. B60H 1/00371
                                                    454/105
(Continued)

FOREIGN PATENT DOCUMENTS

CN       102056784 A     5/2011
EP       2 284 060 A1    2/2011
(Continued)

OTHER PUBLICATIONS

Office Action dated Feb. 4, 2020, issued in corresponding European Patent Application No. 16904664.6, 7 pages.
(Continued)

*Primary Examiner* — Ljiljana V. Ciric
(74) *Attorney, Agent, or Firm* — Buchanan Ingersoll & Rooney PC

(57) ABSTRACT

A vehicle air-conditioning apparatus includes a refrigerant circuit including a heat exchanger, a fan which sends air to the heat exchanger, and a controller which controls the refrigerant circuit and the fan. The vehicle air-conditioning apparatus is mounted on a vehicle. The controller determines if a position of the vehicle or a speed of the vehicle satisfies a predetermined condition. The controller acquires a physical quantity, the physical quantity having already been correlated with a clogging amount of the heat exchanger and the correlation being dependent on whether the predetermined condition is satisfied. The controller determines whether or not clogging occurs in the heat exchanger based on the physical quantity.

7 Claims, 5 Drawing Sheets

(51) Int. Cl.
F25B 49/02 (2006.01)
B60H 1/00 (2006.01)
B60H 1/32 (2006.01)

(52) U.S. Cl.
CPC ..... *B60H 1/00764* (2013.01); *B60H 1/00978* (2013.01); *B60H 1/3225* (2013.01); *B61D 27/00* (2013.01); *B61D 27/0018* (2013.01); *F25B 49/02* (2013.01); *B60H 1/00785* (2013.01); *B60H 2001/3241* (2013.01); *B60H 2001/3255* (2013.01)

(58) Field of Classification Search
CPC ............ B60H 1/00764; B60H 1/00978; B60H 2001/3241; B60H 2001/3255; B60H 1/00785
See application file for complete search history.

(56) References Cited

U.S. PATENT DOCUMENTS

| | | | | |
|---|---|---|---|---|
| 6,283,849 | B1* | 9/2001 | Shields | B60H 3/0608 454/158 |
| 6,582,295 | B1 | 6/2003 | Abouchaar | |
| 9,120,366 | B2* | 9/2015 | Hoke | B60H 3/0616 |
| 10,787,183 | B2* | 9/2020 | Ochiai | B60H 1/00 |
| 10,816,248 | B2* | 10/2020 | Ochiai | F25B 49/02 |
| 2008/0053129 | A1* | 3/2008 | Follette | B60H 1/00371 62/244 |
| 2011/0071722 | A1* | 3/2011 | Uto | B61D 27/0018 701/29.5 |
| 2012/0109429 | A1 | 5/2012 | Shiota et al. | |
| 2013/0288585 | A1* | 10/2013 | Hoke | B60H 3/0616 454/75 |
| 2014/0090406 | A1* | 4/2014 | Ishikawa | F24F 11/30 62/82 |
| 2019/0111949 | A1* | 4/2019 | Ochiai | B60H 1/00 |
| 2019/0126949 | A1* | 5/2019 | Tashiro | B60H 1/3225 |
| 2020/0189358 | A1* | 6/2020 | Tashiro | B61D 27/00 |

FOREIGN PATENT DOCUMENTS

| | | |
|---|---|---|
| JP | 2004291899 A | 10/2004 |
| JP | 2012026702 A | 2/2012 |
| JP | 2013248977 A | 12/2013 |
| JP | 2014230353 A | 12/2014 |
| KR | 10-1497048 B1 | 2/2015 |
| WO | 2009150724 A1 | 12/2009 |
| WO | 2014148477 A1 | 9/2014 |

OTHER PUBLICATIONS

International Search Report (PCT/ISA/210) dated Aug. 23, 2016, by the Japan Patent Office as the International Searching Authority for International Application No. PCT/JP2016/067341.
Written Opinion (PCT/ISA/237) dated Aug. 23, 2016, by the Japan Patent Office as the International Searching Authority for International Application No. PCT/JP2016/067341.
Office Action dated Jul. 2, 2019, issued in corresponding Japan Patent Application No. 2018-522274, 9 pages including 5 pages of English translation.
Extended European Search Report dated May 20, 2019, issued by the European Patent Office in corresponding European Application No. 16904664.6. (7 pages).
Office Action dated Nov. 4, 2019, issued in corresponding Chinese Patent Application No. 201680086453.8, 17 pages including 9 pages of English translation.
Office Action dated Apr. 8, 2020, by the Chinese Patent Office in corresponding Chinese Patent Application No. 201680086453.8 and English translation of the Office Action. (17 pages).
Office Action dated Jul. 20, 2020, by the Chinese Patent Office in corresponding Chinese Patent Application No. 201680086453.8 and English translation of the Office Action. (11 pages).

* cited by examiner

VEHICLE AIR-CONDITIONING APPARATUS AND CLOGGING DETECTION SYSTEM FOR VEHICLE AIR-CONDITIONING APPARATUS

TECHNICAL FIELD

The present invention relates to a vehicle air-conditioning apparatus to be mounted on a vehicle and a clogging detection system for the vehicle air-conditioning apparatus.

BACKGROUND ART

Patent literature 1 discloses an air-conditioning apparatus provided with an outdoor heat exchanger. If clogging occurs in an outdoor heat exchanger, an air resistance in the outdoor heat exchanger increases, and as a result the outdoor heat exchanger does not sufficiently perform heat exchange with outside air. In the air-conditioning apparatus of the patent literature, when the difference between a saturation temperature calculated based on a discharge pressure at a compressor and the temperature of outside air is less than a predetermined temperature, it is determined that clogging occurs in the outdoor heat exchanger.

CITATION LIST

Patent Literature

Patent Literature 1: Japanese Unexamined Patent Application Publication No. 2012-26702

SUMMARY OF INVENTION

Technical Problem

In a vehicle air-conditioning apparatus, the resistance of air in an air passage varies in accordance with the traveling state and position of a vehicle. Therefore, unlike such a stationary air-conditioning device as disclosed in patent literature 1, in the vehicle air-conditioning apparatus, it is hard to accurately detect clogging in the heat exchanger.

The present invention has been made to solve the above problem, and an object of the present invention is to provide a vehicle air-conditioning apparatus and a clogging detection system therefor, which can more accurately detect clogging in a heat exchanger.

Solution to Problem

A vehicle air-conditioning apparatus according to an embodiment of the present invention, which is mounted on a vehicle, includes: a refrigerant circuit including a heat exchanger; a fan which sends air to the heat exchanger; and a controller which controls the refrigerant circuit and the fan. The controller acquires a physical quantity correlated with a clogging amount of the heat exchanger when a position or a speed of the vehicle satisfies a predetermined condition, and determines whether or not clogging occurs in the heat exchanger based on the physical quantity.

A clogging detection system for a vehicle air-conditioning apparatus mounted on a vehicle, according to the embodiment of the present invention, includes: the vehicle air-conditioning apparatus which includes a refrigerant circuit, a fan and a controller, the refrigerant circuit being provided with a heat exchanger, the fan being provided to send air to the heat generator, the controller being provided to control the refrigerant circuit and the fan; and a ground system connected to the controller through a communication network. The controller acquires a physical quantity correlated with a clogging amount of the heat exchanger when a position or a speed of the vehicle satisfies a predetermined condition, and transmits information on the physical quantity to the ground system. The ground system determines whether or not clogging occurs in in the heat exchanger based on the physical quantity.

Advantageous Effects of Invention

According to the present invention, the effect of variation of the resistance of an air passage which is made in accordance with the position or speed of a vehicle can be restricted, whereby clogging in a heat exchanger can be more accurately detected.

DESCRIPTION OF EMBODIMENTS

Embodiment 1

Figure 1:
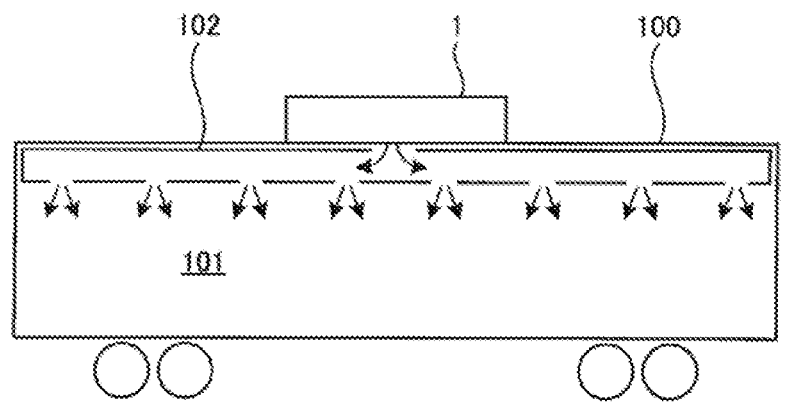
FIG. 1 is a schematic side view illustrating a configuration of a railway vehicle 100 on which a vehicle air-conditioning apparatus 1 according to embodiment 1 of the present invention is mounted.

A vehicle air-conditioning apparatus and a clogging detection system for the vehicle air-conditioning apparatus, according to embodiment 1 of the present invention, will be described. FIG. 1 is a schematic side view illustrating a configuration of a railway vehicle 100 on which a vehicle air-conditioning apparatus 1 according to embodiment 1 is mounted. It should be noted that in the following figures including FIG. 1, the relationship in dimension between components and the shapes thereof may be different from those of actual components.

As illustrated in FIG. 1, the vehicle air-conditioning apparatus 1 is mounted on a roof of the railway vehicle 100. An air duct 102 is provided in a ceiling of a compartment 101 in the railway vehicle 100. From the vehicle air-conditioning apparatus 1, air for air-conditioning is made to blow into the compartment 101 through the air duct 102. Then, air in the compartment 101 is sucked into the vehicle air-conditioning apparatus 1 through a return air duct (not illustrated). It should be noted that the vehicle air-conditioning apparatus 1 of the present embodiment is mounted on the roof of the railway vehicle 100, but it may be mounted under a floor of the railway vehicle 100.

The railway vehicle 100 forms part or the whole of a single train. In other words, a single train is made up of at least one railway vehicle 100. In a single railway vehicle 100, one or more vehicle air-conditioning apparatuses 1 are mounted.

Figure 2:
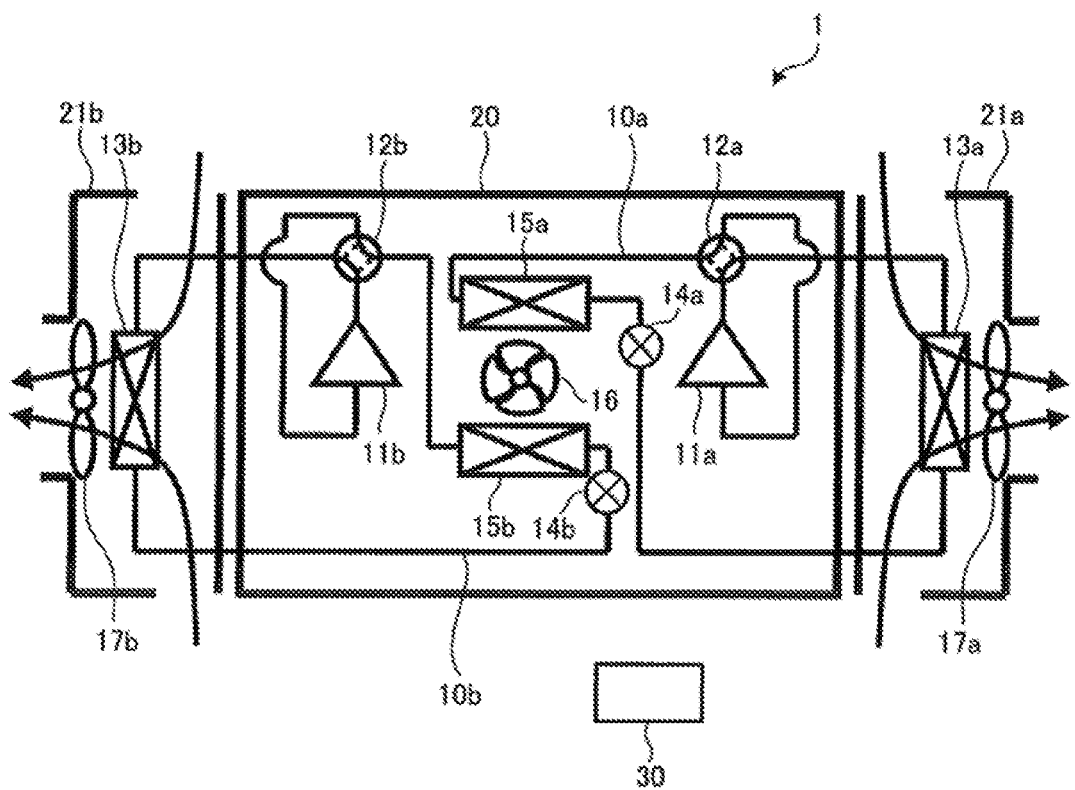
FIG. 2 is a schematic refrigerant circuit diagram illustrating a configuration of the vehicle air-conditioning apparatus 1 according to embodiment 1 of the present invention.

FIG. 2 is a schematic refrigerant circuit diagram illustrating a configuration of the vehicle air-conditioning apparatus 1. As illustrated in FIG. 2, the vehicle air-conditioning apparatus 1 includes, for example, two refrigerant circuits 10a and 10b. The vehicle air-conditioning apparatus 1 includes an outdoor chamber 20, and indoor chambers 21a and 21b which are respectively provided on right and left sides of the outdoor chamber 20 in the longitudinal direction of the railway vehicle 100, with the outdoor chamber 20 interposed between the indoor chambers 21a and 21b.

In a configuration of the refrigerant circuit 10a, a compressor 11a, a four-way valve 12a, an indoor heat exchanger 13a, a pressure-reducing device 14a (for example, a linear electronic expansion valve) and an outdoor heat exchanger 15a are connected by refrigerant pipes. During a heating operation, the compressor 11a, the indoor heat exchanger 13a, the pressure-reducing device 14a and the outdoor heat exchanger 15a are connected in this order. Thereby, the indoor heat exchanger 13a functions as a condenser, and the outdoor heat exchanger 15a functions as an evaporator. During a cooling operation, a refrigerant flow path is switched by the four-way valve 12a, and the compressor 11a, the outdoor heat exchanger 15a, the pressure-reducing device 14a and the indoor heat exchanger 13a are connected in this order. Thereby, the indoor heat exchanger 13a functions as an evaporator, and the outdoor heat exchanger 15a functions as a condenser. The compressor 11a, the four-way valve 12a, the pressure-reducing device 14a and the outdoor heat exchanger 15a are provided in the outdoor chamber 20. The indoor heat exchanger 13a is provided in the indoor chamber 21a.

Similarly, in a configuration of the refrigerant circuit 10b, a compressor 11b, a four-way valve 12b, an indoor heat exchanger 13b, a pressure-reducing device 14b (for example, a linear electronic expansion valve) and an outdoor heat exchanger 15b are connected by refrigerant pipes. The compressor 11b, the four-way valve 12b, the pressure-reducing device 14b and the outdoor heat exchanger 15b are provided in the outdoor chamber 20. The indoor heat exchanger 13b is provided in the indoor chamber 21b.

As the indoor heat exchangers 13a and 13b and the outdoor heat exchangers 15a and 15b, any types of heat exchangers may be applied. For example, as a fin, various kinds of fins such as a plate fin, a corrugated fin and a wave fin can be applied.

In the outdoor chamber 20, an outdoor fan 16 which sends outdoor air to the outdoor heat exchangers 15a and 15b is provided. In the indoor chamber 21a, an indoor fan 17a which sends indoor air to the indoor heat exchanger 13a is provided. Indoor air which has passed through the indoor heat exchanger 13a and exchanged heat with the refrigerant is supplied to, for example, a front portion of the vehicle which is located in the compartment 101. In the indoor chamber 21b, an indoor fan 17b which sends indoor air to the indoor heat exchanger 13b is provided. Indoor air which has passed through the indoor heat exchanger 13b and exchanged heat with refrigerant is supplied to, for example, a rear portion of the vehicle which is located in the compartment 101.

The vehicle air-conditioning apparatus 1 includes a terminal 30 as a controller. The terminal 30 includes a microcomputer provided with a CPU, a ROM, a RAM, an I/O port, etc. The terminal 30 controls the operations of the entire refrigerant circuits 10a and 10b which include the compressors 11a and 11b, the outdoor fan 16, and the indoor fans 17a and 17b based on, for example, detection signals output from various sensors. The terminal 30 functions as a controller of the vehicle air-conditioning apparatus 1, and forms part of a clogging detection system 2, which will be described later. In the present embodiment, air-conditioning apparatuses 1 include respective terminals 30, but the refrigerant circuits 10a and 10b may include respective terminals 30.

Figure 3:
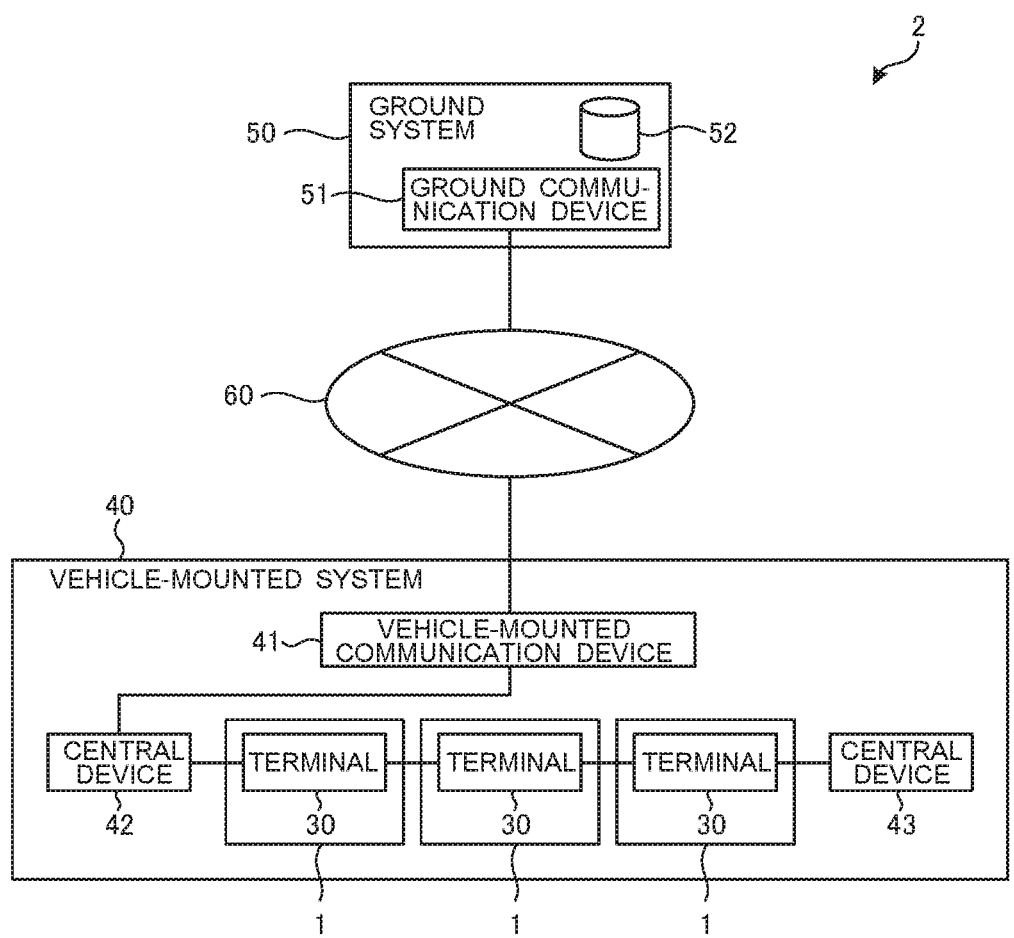
FIG. 3 is a schematic block diagram illustrating a configuration of a clogging detection system 2 of the vehicle air-conditioning apparatus 1 according to embodiment 1 of the present invention.

FIG. 3 is a schematic block diagram illustrating a configuration of the clogging detection system 2 for the vehicle air-conditioning apparatus 1 according to the present embodiment. As illustrated in FIG. 3, the clogging detection system 2 includes at least one vehicle-mounted system 40, and a ground system 50 which is connected to the vehicle-mounted system 40 through a communication network 60. The communication network 60 is a communication network using a wireless communication such as a mobile phone, a wireless LAN, WiMAX (registered trademark) or a millimeter wave.

The vehicle-mounted system 40 is mounted on a train of railway vehicles 100. One vehicle-mounted system 40 is typically mounted on one train. The vehicle-mounted system 40 includes a vehicle-mounted communication device 41 which communicates with the ground system 50 through the communication network 60, central devices 42 and 43 which are provided at respective ones of the railway vehicles 100, which are located at front and rear ends of the train, and a plurality of terminals 30 provided, for example, in respective vehicle air-conditioning apparatuses 1. The vehicle-mounted communication device 41, the central devices 42 and 43 and the terminals 30 function as controllers which control the vehicle air-conditioning apparatuses 1 mounted on the train.

The ground system 50 includes a ground communication device 51 which communicates with the vehicle-mounted system 40 through the communication network 60, a database 52 which stores data received from the vehicle-mounted system 40, and a controller (not illustrated) which controls the ground communication device 51 and the database 52. The ground system 50 transmits and receives data to and from at least one vehicle-mounted system 40 through the communication network 60 to remotely monitor each of the vehicle air-conditioning apparatuses 1.

Figure 4:
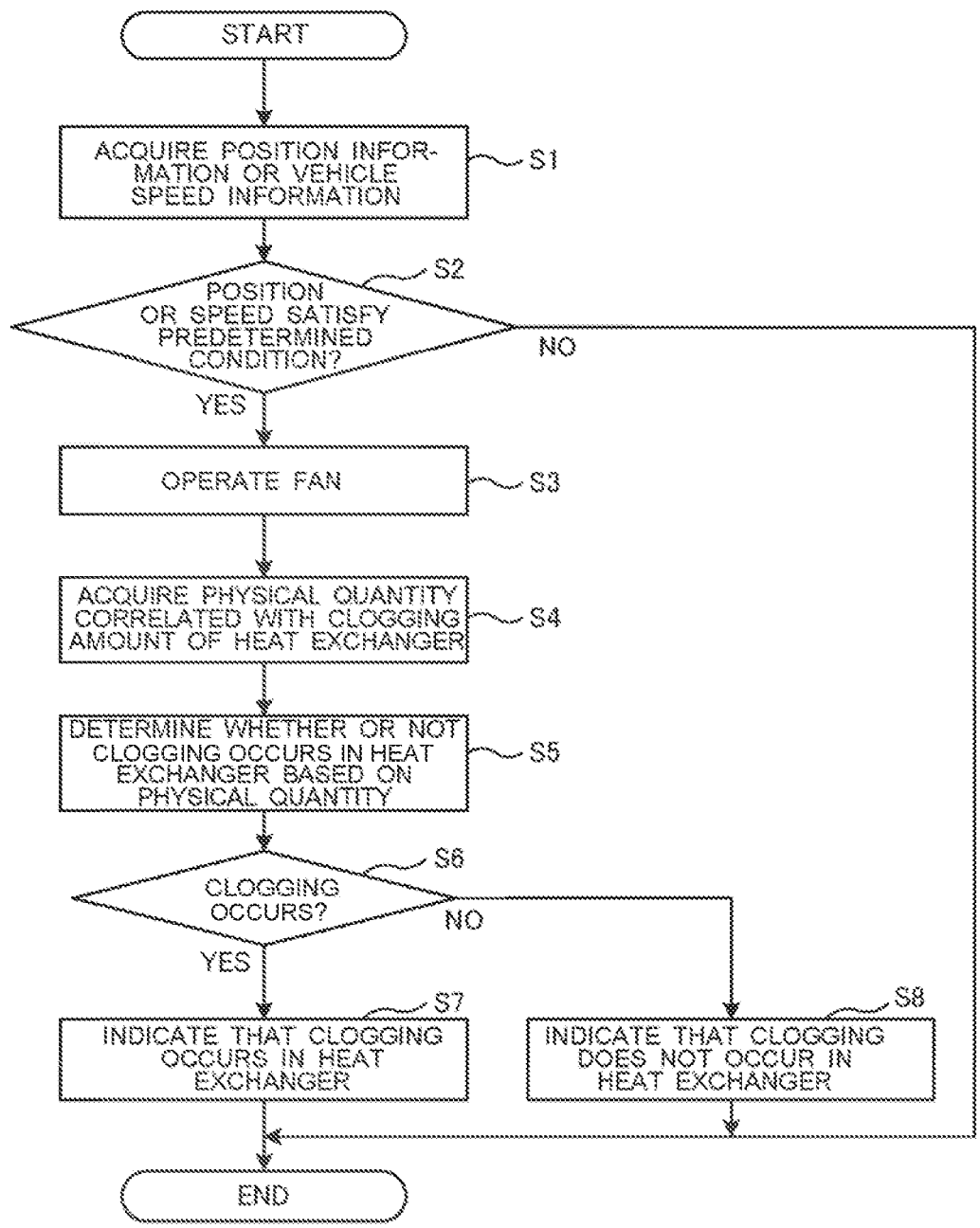
FIG. 4 is a flowchart illustrating an example of the flow of clogging detection processing to be executed by a terminal 30 in the vehicle air-conditioning apparatus 1 according to embodiment 1 of the present invention.

FIG. 4 is a flowchart illustrating an example of the flow of clogging detection processing to be executed by the terminal 30 in the vehicle air-conditioning apparatus 1 according to the present embodiment. The clogging detection processing as illustrated in FIG. 4 is processing of detecting clogging in at least one of the indoor heat exchangers 13a and 13b and outdoor heat exchangers 15a and 15b. Unlike a stationary air-conditioning device, in the vehicle air-conditioning apparatus 1, not only the outdoor heat exchangers 15a and 15b but the indoor heat exchangers 13a and 13b may be subjected to the clogging detection processing. The clogging detection processing is repeatedly executed at regular intervals.

In step S1 as indicated in FIG. 4, the terminal 30 acquires position information or vehicle speed information on the train including the railway vehicle 100, from any of the vehicle-mounted communication device 41 and the central devices 42 and 43. The position information on the train may be two-dimensional or three-dimensional position information received from a GPS, or kilometrage information on the distance from a starting station to the train.

In step S2, the terminal 30 determines whether the position or speed of the train satisfies a predetermined condition based on the acquired position information or vehicle speed information. The following are examples of the predetermined condition: the train speed is a specified speed greater than 0 km/h (that is, the train is traveling at the specified speed); the train speed is 0 km/h (that is, the train is stopped); the position of the train is not located in a tunnel; and the train is not located at a station. The position of the train can be seen based on the position information. The train speed can be seen based on the vehicle speed information, or position information currently acquired and position information acquired previously. In step S2, when it is determined that the position or speed of the train satisfies the predetermined condition, the process to be carried out proceeds to step S3, and when the position or speed of the train does not satisfy the predetermined condition, the process ends.

In such a manner, in step S2, it is determined whether or not the predetermined condition is satisfied. This is intended to ensure that with respect to the condition under which a physical quantity correlated with the clogging amount of the heat exchanger is acquired in step S4 to be described later, the conditions of step S4 carried out a number of times are as close as possible to each other. As a result, based on acquired physical quantities, the clogging amount of the heat exchanger can be estimated. For example, a physical quantity acquired by the vehicle air-conditioning apparatus is compared with that acquired by another vehicle air-conditioning apparatus, whereby the clogging amount of the heat exchanger in the former vehicle air-conditioning apparatus can be relatively seen.

The physical quantity correlated with the clogging amount of the heat exchanger varies in accordance with the speed of the train. Therefore, the conditions under which physical quantities are acquired can be made closer to each other by acquiring the physical quantities when the speed of the train is a specified speed. It should be noted that if a relationship between a physical amount (for example, current flowing in the fan) at the time when the train is stationary and that at the time when the train is traveling is known in advance or if a relationship between the speed of the train and the variation of the physical amount which is made in accordance with the speed of the train is known in advance, the acquired physical amount can be corrected in accordance with the speed of the train.

The resistance of an air passage for outdoor air particularly varies in accordance with whether the train is located in the tunnel or another place. Thus, the physical quantity correlated with the clogging amount of the heat exchanger varies in accordance with whether the train is located in the tunnel or another place. Therefore, by acquiring physical quantities when the train is not located in the tunnel, the conditions under the physical quantities are acquired can be made closer to each other. Position information on tunnels is stored in the ROM of the terminal 30 in advance. It should be noted that the terminal 30 may determine whether the train is located in the tunnel or not, based on a detection signal from an illuminance sensor provided in the vehicle air-conditioning apparatus 1 or the railway vehicle 100.

Furthermore, the resistance of the air passage for outdoor air particularly varies in accordance with whether the train is located at a station or not. Thus, the physical quantity correlated with the clogging amount of the heat exchanger varies in accordance with whether the train is located at the station or not. Therefore, by acquiring physical quantities when the train is not located at the station, the conditions under which the physical quantities are acquired can be made closer to each other. The position information on stations is stored in the ROM of the terminal 30 in advance. The physical quantities may be acquired when the train is located in neither the tunnel nor at the station.

In step S3, a fan (for example, the outdoor fan 16 or the indoor fans 17a and 17b) which sends air to at least a heat exchanger to be subjected to detection for clogging is caused to operate by the terminal 30. In this case, when the fan is in a stopped state, it starts to operate, and when it has already operated, it continues to operate. Also, the terminal 30 causes the refrigerant circuits 10a and 10b to operate, as occasion needs.

In step S4, the terminal 30 acquires a physical quantity correlated with the clogging amount of the heat exchanger. The following are examples of the physical quantity correlated with the clogging amount of the heat exchanger: an electric power supplied to the fan; a current flowing in the fan; the rotation speed of the fan; the temperature difference between the condensing temperature or evaporating temperature of refrigerant in the heat exchanger and the temperature of air sent to the heat exchanger; and an inner pressure of the passenger compartment. These physical quantities are acquired based on the detection signals output from various sensors. The terminal 30 may calculate an air resistance of the air passage at the heat exchanger based on a torque of the fan, which is calculated based on the above current and the above rotation speed, to quantify the clogging amount of the heat exchanger. Furthermore, the terminal 30 may calculate a heat exchanging performance of the heat exchanger based on the above current and the above temperature difference to quantify the clogging amount of the heat exchanger.

In step S5, the terminal 30 determines whether or not clogging occurs in the heat exchanger based on the acquired physical quantity. For example, the terminal 30 determines as a reference physical quantity, a physical quantity acquired from a vehicle air-conditioning apparatus mounted on a railway vehicle which is other than the railway vehicle 100 and which is included in the same train as the railway vehicle 100, compares the physical quantity acquired in step S4 with the reference physical quantity, and determines whether or not clogging occurs in the heat exchanger based the result of the comparison. The physical quantity from the vehicle air-conditioning apparatus mounted on the above other vehicle can be, for example, acquired from any of the terminal 30, the central devices 42 and 43 and the vehicle-mounted communication device 41 of the vehicle air-conditioning apparatus.

With respect to the maintenance of vehicle air-conditioning apparatuses 1 mounted on vehicles, there is a case where the maintenance is carried out in units of one vehicle, and is also on different days for respective vehicles. The clogging amount of the heat exchanger is the minimum immediately after the maintenance of the vehicle air-conditioning apparatus 1 is carried out, and then gradually increases as the operating time of the vehicle air-conditioning apparatus 1, the traveling distance of the railway vehicle 100, etc., increase. In view of this point, it is preferable to determine as the reference physical quantity, the physical quantity acquired from one of all the vehicle air-conditioning apparatuses, which was subjected to maintenance on the latest day. Alternatively, a past one of physical quantities acquired by the same vehicle air-conditioning apparatus 1 (for example, a physical quantity acquired for the first time after the maintenance of the vehicle air-conditioning apparatus 1 is carried out) may be set as the reference physical quantity. Preferably, the physical quantities to be compared with each other should be acquired under conditions related to the position or speed of the train, that are as close as possible to each other.

For example, when the difference between the physical quantity acquired in step S4 and the reference physical quantity or the ratio of the physical quantity acquired in step S4 to the reference physical quantity is greater than or equal to a threshold, the terminal 30 determines that clogging occurs in the heat exchanger. Otherwise, the terminal 30 determines that clogging does not occur in the heat exchanger.

When the terminal 30 determines that clogging occurs in the heat exchanger (Yes in step S6), the process proceeds to step S7, and when the terminal 30 determines that clogging does not occur in the heat exchanger (No in step S6), the process proceeds to step S8.

In step S7, the terminal 30 indicates that clogging occurs in the heat exchanger. For example, the terminal 30 transmits information indicating that clogging occurs in the heat exchanger of the vehicle air-conditioning apparatus 1 to the central devices 42 and 43. The central devices 42 and 43 causes respective display units provided thereat to display information indicating which of the vehicle air-conditioning apparatuses 1 is a vehicle air-conditioning apparatus 1 that clogging occurs in its heat exchanger. The terminal 30 may transmit the information indicating that clogging occurs in the heat exchanger of the vehicle air-conditioning apparatus 1 to the ground system 50 through the vehicle-mounted communication device 41. The ground system 50 may cause a display unit provided thereat to display information indicating which of the trains is a train including a vehicle air-conditioning apparatus 1 that clogging occurs in its heat exchanger, and which of the vehicle air-conditioning apparatuses 1 is the vehicle air-conditioning apparatus 1 that clogging occurs in its heat exchanger.

In step S8, the terminal 30 indicates that clogging does not occur in the heat exchanger. For example, the terminal 30 transmits information indicating that clogging does not occur in the heat exchanger of the vehicle air-conditioning apparatus 1 to the central devices 42 and 43. The central devices 42 and 43 cause the respective display units provided thereat to display the information indicating which of the vehicle air-conditioning apparatuses 1 is a vehicle air-conditioning apparatus 1 that clogging does not occur in its heat exchanger. The terminal 30 may transmit the information indicating that clogging does not occur in the heat exchanger of the vehicle air-conditioning apparatus 1 to the ground system 50 through the vehicle-mounted communication device 41. The ground system 50 may cause the display unit provided thereat to display information indicating which of trains is a train including a vehicle air-conditioning apparatus 1 that clogging does not occur in its heat exchanger, and which of the vehicle air-conditioning apparatuses 1 is the vehicle air-conditioning apparatus that clogging does not occur in its heat exchanger.

As described above, the vehicle air-conditioning apparatus 1 according to the present embodiment includes the refrigerant circuits 10a and 10b including the heat exchangers (for example, the outdoor heat exchangers 15a and 15b and the indoor heat exchangers 13a and 13b), the fans (for example, the outdoor fan 16, and the indoor fans 17a and 17b) which send air to the heat generators, and a controller (for example, the terminal 30) which controls the refrigerant circuits 10a and 10b and the fans. The vehicle air-conditioning apparatus 1 is mounted on the railway vehicle 100. The controller acquires a physical quantity correlated with the clogging amount of the heat exchanger when the position or speed of the railway vehicle 100 satisfies the predetermined condition, and determines whether or not clogging occurs in the heat exchanger based on the acquired physical quantity.

In the present embodiment, the controller determines whether or not clogging occurs in the heat exchanger based on the physical quantity acquired when the position or speed of the railway vehicle 100 satisfies the predetermined condition. Thus, the influence of variation of the resistance of the air passage, which is made in accordance with the position or speed of the railway vehicle 100, can be restricted, whereby clogging in the heat exchanger can be more accurately detected. Therefore, the maintenance of the vehicle air-conditioning apparatus 1 can be carried out at a more appropriate timing, thereby preventing the power consumption from being increased by clogging in the heat exchanger, and also preventing occurrence of a failure in the fan which is caused by an increase of a load. The heat exchanging performance of the heat exchanger can be maintained, and the comfortability of the passenger compartment can be improved.

In the vehicle air-conditioning apparatus 1 according to the present embodiment, the controller may be configured to compare the above physical quantity with a physical quantity acquired from the vehicle air-conditioning apparatus mounted on a railway vehicle other from the railway vehicle 100, and determine whether or not clogging occurs in the heat exchanger based on the result of the comparison.

In the vehicle air-conditioning apparatus 1 according to the present embodiment, the above predetermined condition may be a condition that the railway vehicle 100 is not located in a tunnel, or the speed of the railway vehicle 100 is a specified peed.

In the vehicle air-conditioning apparatus 1 according to the present embodiment, the physical quantity may include any of the electric power supplied to the fan, the current flowing through the fan, the rotation speed of the fan, the temperature difference between the condensing temperature or evaporating temperature of the refrigerant in the heat exchanger and the temperature of air sent to the heat exchanger, the internal pressure of the passenger compartment, the air resistance in the heat exchanger, and the heat exchanging performance of the heat exchanger.

Embodiment 2

A clogging detection system for a vehicle air-conditioning apparatus, according to embodiment 2 of the present invention, will be described. In embodiment 1, as described above, clogging in the heat exchanger is detected by the terminal 30 of each of vehicle air-conditioning apparatuses 1. In embodiment 2, clogging in the heat exchanger is detected by the ground system 50, and a schematic configuration of a clogging detection system 2 is the same as that as illustrated in FIG. 3.

Figure 5:
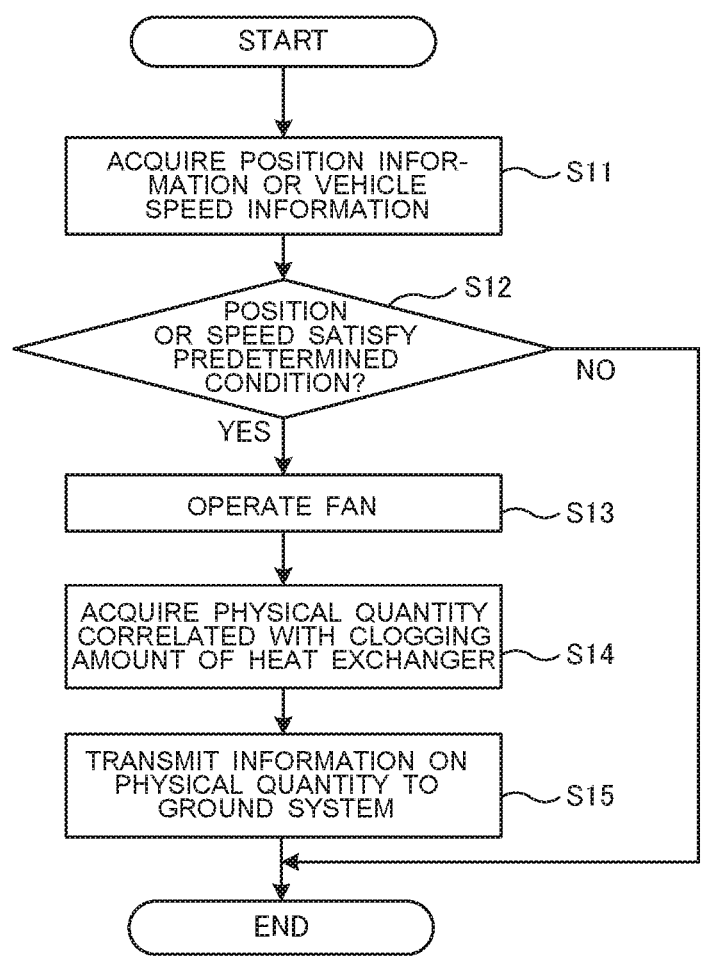
FIG. 5 is a flowchart illustrating an example of the flow of physical quantity acquisition processing to be executed by a terminal 30 in a clogging detection system 2 of a vehicle air-conditioning apparatus 1 according to embodiment 2 of the present invention.

FIG. 5 is a flowchart illustrating an example of the flow of physical quantity acquisition processing to be executed by the terminal 30 in the clogging detection system 2 for the vehicle air-conditioning apparatus 1 according to embodiment 2. The physical quantity acquisition processing is repeatedly executed at regular intervals. Steps S11 to S14 as illustrated in FIG. 5 are the same as steps S1 to S4 as illustrated in FIG. 4, and their explanations will thus be omitted.

In step S15, the terminal 30 transmits information on an acquired physical quantity to the ground system 50 through the vehicle-mounted communication device 41 and the communication network 60.

Figure 6:
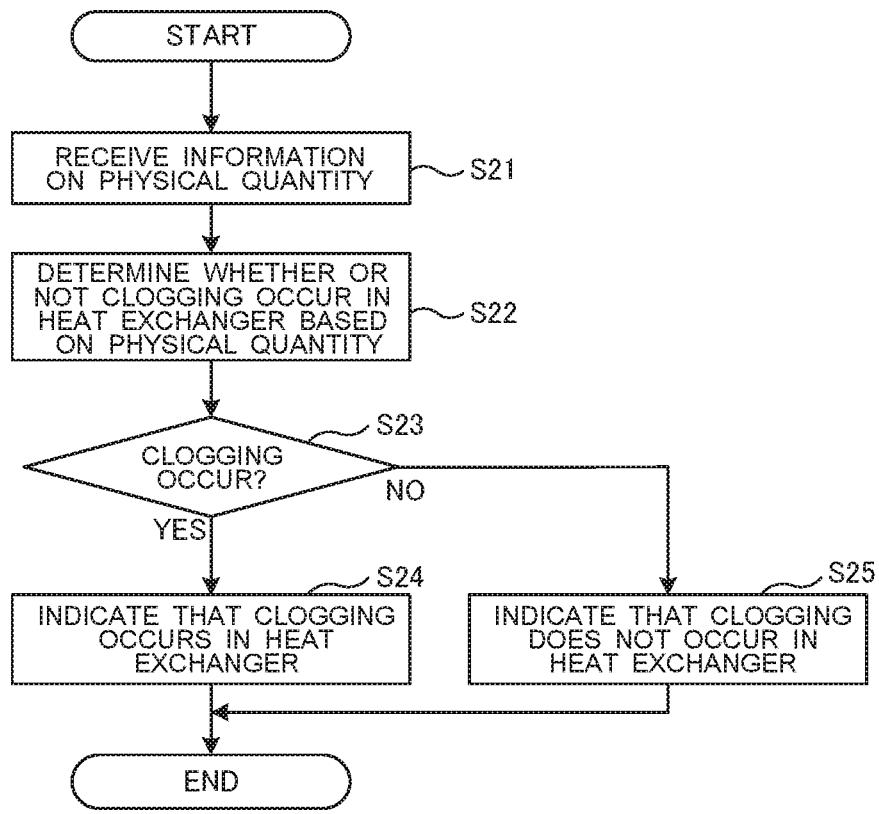
FIG. 6 is a flowchart illustrating an example of the flow of clogging detection processing to be executed by a ground system 50 in the clogging detection system 2 of the vehicle air-conditioning apparatus 1 according to embodiment 2 of the present invention.

FIG. 6 is a flowchart illustrating an example of the flow of clogging detection processing to be executed by the ground system 50 in the clogging detection system 2 of the vehicle air-conditioning apparatus 1 according to the present embodiment. The clogging detection processing is repeatedly executed at regular intervals. In step S21 in FIG. 6, the ground system 50 receives information on a physical quantity from a vehicle-mounted system 40 of a given train. The ground system 50 stores the received information on the physical quantity in a database 52. The database 52 stores information items on physical quantities which are transmitted from a plurality of vehicle-mounted systems 40.

In step S22, the ground system 50 compares the physical quantity acquired from the vehicle-mounted system 40 of the above train with a physical quantity acquired from a vehicle-mounted system of another train (for example, a train which travels ahead of or behind the above train), and determines whether or not clogging occurs in the heat exchanger based on the result of the comparison. In this case, it is preferable to determine as a reference physical quantity, a physical quantity acquired from one of all vehicle air-conditioning apparatuses mounted on the above another train, which was subjected to maintenance on the latest day. Furthermore, it is preferable that physical quantities to be compared with each other be acquired under conditions regarding the position or speed of the vehicle, which are as close as possible to each other.

When it is determined that clogging occurs in the heat exchanger (Yes in step S23), the process proceeds to step S24, and when it is determined that clogging does not occur in the heat exchanger (No in step S23), the process proceeds to step S25.

In step S24, the ground system 50 indicates that clogging occurs in the heat exchanger. For example, the ground system 50 causes the display unit provided thereat to display information indicating which of the trains is a train including a vehicle air-conditioning apparatus that clogging occurs in its heat exchanger, and which of the air-conditioning apparatuses 1 is the vehicle air-conditioning apparatus 1 that clogging occurs in its heat exchanger. The ground system 50 may transmit the information indicating which of the vehicle air-conditioning apparatuses 1 is the vehicle air-conditioning apparatus 1 that clogging occurs in its heat exchanger to the vehicle-mounted system 40 of the train on which the above vehicle air-conditioning apparatus 1 is mounted. In this case, upon reception of the information, the vehicle-mounted system 40 causes, for example, the display units provided at the central devices 42 and 43 to display the information indicating which of the vehicle air conditioning apparatuses 1 is the vehicle air-conditioning apparatus that clogging occurs in its heat exchanger In step S25, the ground system 50 indicates that clogging does not occur in the heat exchanger. For example, the ground system 50 causes the display unit provided thereat to display information indicating which of the trains is a train including a vehicle air-conditioning apparatus 1 that clogging does not occur in its heat exchanger, and which of the vehicle air-conditioning apparatuses 1 is the vehicle air-conditioning apparatus 1 that clogging does not occur in its heat exchanger. The ground system 50 may transmit the information indicating which of the vehicle air-conditioning apparatuses 1 is the vehicle air-conditioning apparatus that clogging does not occur in its heat exchanger to the vehicle-mounted system 40 of the train on which the above vehicle air-conditioning apparatus 1 is mounted. In this case, upon reception of the information, the vehicle-mounted system 40 causes, for example, the display units of the central devices 42 and 43 to display information indicating which of the vehicle air-conditioning apparatuses 1 is the vehicle air-conditioning apparatus 1 that clogging does not occur in its heat exchanger.

As described above, the clogging detection system 2 for the vehicle air-conditioning apparatus 1 according to the present embodiment includes the vehicle air-conditioning apparatus 1 and the ground system 50. The vehicle air-conditioning apparatus 1 includes: the refrigerant circuits 10a and 10b including the heat exchangers (for example, the outdoor heat exchanger 15a and 15b and the indoor heat exchangers 13a and 13b); the fans (for example, the outdoor fan 16 and the indoor fans 17a and 17b) which send air to the heat exchangers; and the controllers (for example, the vehicle-mounted communication device 41, the central devices 42 and 43 and the terminal 30) which control the refrigerant circuits 10a and 10b and the fans. The vehicle air-conditioning apparatus 1 is mounted on the railway vehicle 100, and the ground system 50 is connected to the controller through the communication network 60. The controller acquires a physical quantity correlated with the clogging amount of the heat exchanger when the position or speed of the railway vehicle 100 satisfies the predetermined condition, and transmit information on the physical quantity to the ground system 50. The ground system 50 determines whether or not clogging occurs in the heat exchanger based on the physical quantity.

According to the present embodiment, it is possible to more accurately detect clogging in the heat exchanger as in embodiment 1. Therefore, the maintenance of the vehicle air-conditioning apparatus 1 can be carried out at a more appropriate timing, thereby preventing the power consumption from being increased due to clogging in the heat exchanger, and also preventing occurrence of a failure of the fan which is caused by increasing of the load. The heat exchanging performance of the heat exchanger can be maintained, whereby the comfortability of the passenger compartment can be improved.

In the clogging detection system 2 for the vehicle air-conditioning apparatus 1 according to the present embodiment, the ground system 50 may be configured to compare the above physical quantity with a physical quantity acquired from a vehicle air-conditioning apparatus mounted on a vehicle in a train other than a train including the railway vehicle 100, and determine whether or not clogging occurs in the heat exchanger based on the result of the comparison.

The above embodiments can be combined and put to practical use.

REFERENCE SIGNS LIST

| | |
|---|---|
| 1 | vehicle air-conditioning apparatus |
| 2 | clogging detection system |
| 10a, 10b | refrigerant circuit |
| 11a, 11b | compressor |
| 12a, 12b | four-way valve |
| 13a, 13b | indoor heat exchanger |
| 14a, 14b | pressure-reducing device |

-continued

| | |
|---|---|
| 15a, 15b | outdoor heat exchanger |
| 16 | outdoor fan |
| 17a, 17b | indoor fan |
| 20 | outdoor chamber |
| 21a, 21b | indoor chamber |
| 30 | terminal |
| 40 | vehicle-mounted system |
| 41 | vehicle-mounted communication device |
| 42, 43 | central device |
| 50 | ground system |
| 51 | ground communication device |
| 52 | database |
| 60 | communication network |
| 100 | railway vehicle |
| 101 | compartment |
| 102 | air duct |

The invention claimed is:

1. A vehicle air-conditioning apparatus which is mounted on a vehicle, comprising:
a refrigerant circuit including a heat exchanger;
a fan configured to send air to the heat exchanger; and
a controller configured to control the refrigerant circuit and the fan,
wherein the controller is configured to:
determine if a position of the vehicle or a speed of the vehicle satisfies a predetermined condition;
acquire a physical quantity, the physical quantity having already been correlated with a clogging amount of the heat exchanger, the correlation being dependent on whether the predetermined condition is satisfied; and
determine whether or not clogging occurs in the heat exchanger based on the physical quantity.

2. The vehicle air-conditioning apparatus of claim 1, wherein
the controller is configured to compare the physical quantity with a physical quantity acquired from a vehicle air-conditioning apparatus mounted on another vehicle, and determine whether or not clogging occurs in the heat exchanger based on a result of the comparison.

3. The vehicle air-conditioning apparatus of claim 1, wherein
the predetermined condition is a position of the vehicle and the position of the vehicle is a condition that corresponds to the vehicle not being located in a tunnel.

4. The vehicle air-conditioning apparatus of claim 1, wherein
the predetermined condition is a speed of the vehicle and the speed of the vehicle is a condition that corresponds to the speed of the vehicle being a specified speed.

5. The vehicle air-conditioning apparatus of claim 1, wherein
the physical quantity includes any one of:
an electric power supplied to the fan;
an electric current flowing in the fan;
a rotation speed of the fan;
a temperature difference between a condensing temperature or an evaporating temperature of refrigerant in the heat exchanger and a temperature of the air sent to the heat exchanger;
an internal pressure of a passenger compartment;
an air resistance at the heat exchanger; and
a heat exchanging performance of the heat exchanger.

6. A clogging detection system for a vehicle air-conditioning apparatus which is mounted on a vehicle, comprising:
the vehicle air-conditioning apparatus which includes a refrigerant circuit including a heat exchanger, a fan configured to send air to the heat exchanger, and a controller configured to control the refrigerant circuit and the fan; and
a ground system connected to the controller through a communication network,
wherein the controller is configured to determine if a position of the vehicle or a speed of the vehicle satisfies a predetermined condition,
acquire a physical quantity, the physical quantity having already been correlated with a clogging amount of the heat exchanger, the correlation being dependent on whether the predetermined condition is satisfied, and transmit information on the physical quantity to the ground system, and
the ground system is configured to determine whether or not clogging occurs in the heat exchanger based on the physical quantity.

7. The clogging detection system of claim 6, wherein
the ground system is configured to compare the physical quantity with a physical quantity acquired from a vehicle air-conditioning apparatus mounted on a vehicle in a train other than a train including the vehicle, and determine whether or not clogging occurs in the heat exchanger based on a result of the comparison.

* * * * *